United States Patent
Bhattacharyya et al.

(10) Patent No.: US 8,365,261 B2
(45) Date of Patent: Jan. 29, 2013

(54) IMPLEMENTING ORGANIZATION-SPECIFIC POLICY DURING ESTABLISHMENT OF AN AUTONOMOUS CONNECTION BETWEEN COMPUTER RESOURCES

(75) Inventors: Anamitra Bhattacharyya, Chelmsford, MA (US); Ann Marie Fred, Alexandria, VA (US); Hari H. Madduri, Austin, TX (US); Thomas J. Sarasin, Fitchburg, MA (US); Sumit Taank, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/169,807

(22) Filed: Jul. 9, 2008

(65) Prior Publication Data
US 2010/0011408 A1    Jan. 14, 2010

(51) Int. Cl.
*H04L 29/06* (2006.01)
*H04L 9/32* (2006.01)

(52) U.S. Cl. .................. 726/6; 726/1; 713/166

(58) Field of Classification Search .......... 726/1–7, 726/18, 19, 27; 713/150, 166, 164; 380/255
See application file for complete search history.

(56) References Cited

U.S. PATENT DOCUMENTS

| | | | | |
|---|---|---|---|---|
| 6,484,173 | B1 * | 11/2002 | O'Hare et al. | 1/1 |
| 6,684,330 | B1 * | 1/2004 | Wack et al. | 713/162 |
| 7,231,661 | B1 * | 6/2007 | Villavicencio et al. | 726/4 |
| 7,546,452 | B2 * | 6/2009 | Aissi et al. | 713/156 |
| 7,634,253 | B2 * | 12/2009 | Plestid et al. | 455/411 |
| 7,779,420 | B1 * | 8/2010 | Puttu et al. | 719/318 |
| 7,937,073 | B2 * | 5/2011 | Plestid et al. | 455/411 |
| 8,005,854 | B2 * | 8/2011 | Chawla et al. | 707/769 |
| 8,010,777 | B2 * | 8/2011 | Nandan et al. | 713/100 |
| 8,107,928 | B2 * | 1/2012 | Plestid et al. | 455/411 |
| 2003/0131096 | A1 * | 7/2003 | Goringe et al. | 709/224 |
| 2006/0248577 | A1 * | 11/2006 | Beghian et al. | 726/5 |
| 2007/0136792 | A1 * | 6/2007 | Ting et al. | 726/5 |
| 2008/0052384 | A1 * | 2/2008 | Marl et al. | 709/223 |
| 2008/0109869 | A1 * | 5/2008 | Kulkarni et al. | 726/1 |
| 2009/0019141 | A1 * | 1/2009 | Bush et al. | 709/223 |
| 2009/0077638 | A1 * | 3/2009 | Norman et al. | 726/5 |

FOREIGN PATENT DOCUMENTS
EP    1758335 A1 *    2/2007

\* cited by examiner

*Primary Examiner* — Zachary A Davis
(74) *Attorney, Agent, or Firm* — Steven L. Nichols; Van Cott, Bagley, Cornwall & McCarthy P.C.

(57) ABSTRACT

A method for implementing organization-specific policy during establishment of an autonomous connection between computer resources includes evaluating a relative priority between default credentials and alternative credentials; and using the highest priority credentials to establish a connection between the computer resources. The alternative credentials are based on organization-specific policy and provide for autonomous connections between computer resources differently than the default credentials.

20 Claims, 5 Drawing Sheets

IMPLEMENTING ORGANIZATION-SPECIFIC POLICY DURING ESTABLISHMENT OF AN AUTONOMOUS CONNECTION BETWEEN COMPUTER RESOURCES

BACKGROUND OF THE INVENTION

Aspects of the present invention relate in general to computer processing and, more specifically, to the automation of tasks within computer systems.

To facilitate the increasing automation of tasks within computer systems, servers frequently have autonomous processes for connecting to internal and external computer resources. Simultaneously, increased security risks require additional control and safeguards against misuse of an organization's computer resources. In many instances, the most flexible method of implementing security policies and other procedures within an organization is to tailor the policies to the unique needs and characteristics of that organization. It is often desirable for these organization-specific policies to be implemented within the autonomous processes for establishing connections between computer resources. The implementation of these organization-specific policies often requires extensive time and an intimate knowledge of the components that interact within the computer system. In some cases, multiple elements within the computer system must be modified to implement the desired security procedures. Thus, there is a need for a flexible method through which organization-specific policies relating to autonomous connections between computer resources can be implemented independently of other components.

BRIEF SUMMARY OF THE INVENTION

A method for implementing organization-specific code during an autonomous establishment of a connection between computer resources includes establishing a default connection workflow which returns default credentials for allowing the connection between the computer resources, establishing an alternative connection workflow applying organization-specific code and returning alternative credentials for allowing the connection between the computer resources, evaluating the relative priority between the default credentials and the alternative credentials; and using the highest priority credentials to establish the connection between the computer resources. A computer system for implementing organization-specific code during the autonomous establishment of a connection between computer resources includes a high level process configured to create a connection request; process code receiving the connection request and communicating with a credential mapper. The credential mapper applies organization-specific code and returns credentials for establishing a connection between the computer resources.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the present specification and appended claims the term "remote system" or "remote server" refers to an internal or external computer resource which is separate from a first system or server and requires the first system to supply credentials before a data connection will be allowed between the first or requesting system and the remote system. In some examples, both the remote and requesting systems may be owned or operated by the same enterprise, but still require credentials for the requesting system to receive access to the remote system. Consequently, "remote" does not necessarily imply either physical distance or separate ownership.

The term "computer resource" is used herein and in the appended claims to refer broadly to any system, server or other computerized entity that may either request a connection with another resource or receive a request with supporting credentials to allow a connection to another resource. Consequently, as used herein and in the appended claims, the term "first computer resource" may be used to designate a requesting system or server, while the term "second computer resource" may be used to designate the remote system or server which is receiving credentials before allowing a connection with the first computer resource.

The term "workflow" is used herein and in the appended claims to refer to the method and/or means of creating a connection between first and second computer resources using a particular set of credentials. Thus, we may refer to a default connection workflow using default credentials or an alternative connection workflow using alternative credentials.

There are two common methods for obtaining the credentials needed to connect to a remote system and establishing a corresponding connection workflow. In the first method, the system prompts a human to enter appropriate credentials (such as a user identifier and password) at the time the connection is made. The human operator is required to have access to or remember the appropriate credentials which will allow access to the remote system. This method is acceptable in some circumstances but is not feasible for many automated tasks that are automated specifically because they are optimally conducted whether or not a human operator is present to input credentials to enable a connection to the remote system. For example, the automated tasks may be scheduled at times when no human operator is likely to be available to input credentials to enable the system to access the desired remote system. For operations that are supposed to run behind the scenes, such as automated workflows or escalations, there is typically not a human involved.

In a second method, the system administrator enters credentials required to connect to a remote system and stores them in a database accessible to the request system. The information may be stored in a data structure such as a parameter map, hashmap, or an endpoint. For example, a hashmap is a data structure that associates keys with values. The hashmap supports lookup. For example, given a key, such as the identity of a remote server, the hashmap provides the corresponding value, such as the credentials, e.g., username and password associated with the remote server. An endpoint is a data structure that stores information about the remote server such as the server name, communication port used to access the server, the protocol used to connect to it, connection properties, and a single user identifier and password used by the requesting system to connect to the remote server. This information structure is then retrieved automatically by the requesting system when it is needed to allow access to the remote server. Looking up credentials from a data structure is a relatively inflexible one-to-one (or 1:1) mapping of credentials to a remote server or system.

The second method allows for automated access to remote systems and servers, but organizations often need more sophisticated credential mapping. Because the security and procedures within customer organizations vary widely, it is typical to write unique code to implement these organization-specific policies and needs. An example of an organization-specific need may include an organization which wishes to look up a user identification and password from a directory service. Alternatively, the organization may have a security policy stating that only a certain class of users may connect to a particular remote system or a policy that all administrators must use one set of credentials while other entities use another set of credentials.

Implementing these organization-specific policies typically requires that the customer, support entity, or creator of the system software make the code changes or additions to various interrelated components within the software. Making these changes can require a relatively high degree of training and knowledge about the implementation details of the system software. Additionally if the code is implemented by the creator of the system software, the customer may have to wait for the release of the next version of the system software to receive their requested code or functionality.

Thus, there is a need for a method through which organization-specific policies and procedures can be implemented as a modular, independent credential mapping module.

According to one exemplary embodiment, changes to the credential mapping code/module can be made without an intimate knowledge of the implementation details of other modules and systems. The software system is initially configured to recognize and universally apply this credential mapping code/module to connections between requesting and remote systems regardless of the protocol or format in which the credentials are supplied. This provides flexibility and convenience in adapting to the organization's needs and security requirements.

Figure 1:
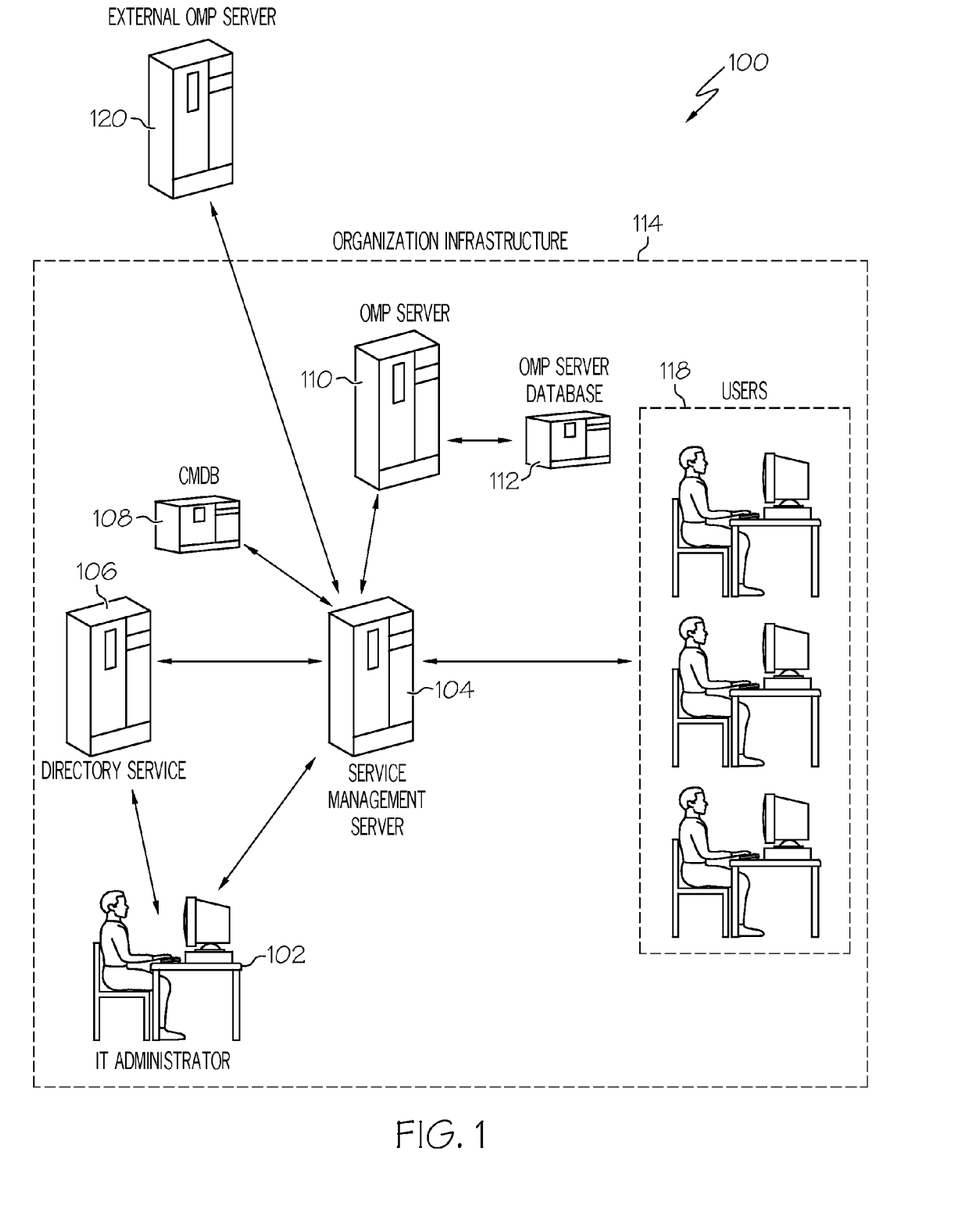
FIG. 1 is a diagram of an illustrative computer system where a server running automated processes makes connections to remote servers, according to one exemplary embodiment of principles described herein.

FIG. 1 is a diagram of an illustrative distributed computing system (100) where a server running automated processes needs to make connections to remote servers. In FIG. 1, the illustrative distributed computer system (100) uses a service management server (104) to provide efficient use of resources and timely service within a distributed computing system (100). Distributed computing systems (100) can be difficult to manage because of their size and complexity. Distributed computing systems (100) typically consist of a large number of heterogeneous computing devices connected by one or more communication networks. These heterogeneous computing devices may utilize a variety of operating systems, communication protocols, and support widely diverse individual user applications.

The service management server (104), in cooperation with various other computing elements, performs a variety of automated functions to manage and coordinate the various resources within the distributed computing system (100) and organization (114). These functions may include: providing visibility into business applications running on various remote servers within the organization, automatically creating and maintaining infrastructure maps, mapping of run time dependencies, updating change histories, event management handling, and optimizing the infrastructure's performance/availability. To perform these and other functions, the service management server (104) routinely and automatically connects to various remote servers. For purposes of illustration, only a few of the possible elements with a distributed computing system are shown in FIG. 1.

According to one exemplary embodiment, the distributed computing system (100) may comprise: the service management server (104), an information technology (IT) administrator (102), a directory service (106), a configuration management database (CMDB) (108), an operational management process (OMP) server (110), an OMP server database (112), a number of users (118), and an external OMP server (120). It will be apparent to those of skill in the art that the components represented in FIG. 1 represent only a few of the possible elements in an IT infrastructure. Additionally, it will be recognized that various functions performed by the illustrated elements could be performed in a variety of ways. By way of example and not limitation, the components could be combined into a single physical computing device, or the functions could be further distributed among additional computing devices.

In the illustrative example shown in FIG. 1, the IT administrator (102) is typically a trusted individual or group of individuals that have responsibility for planning, overseeing, and maintaining the organizational infrastructure (114). The IT administrator (102) would typically have access to all or most of the computing elements within the organizational infrastructure (114). For simplicity, only a few of the connections between the IT Administrator (102) and the other computing devices are shown.

The directory service (106) is a software application or set of applications that store and organize information about a computer network's users and network resources. The directory service (106) allows the IT administrator (102) to manage the users' access to the resources. In FIG. 1, the directory service (106) is represented as a single functional unit and may contain a repository database which holds information about the objects that are managed in the directory service (106). As mentioned above, the directory service (106) functionality may be distributed over a number of computational elements or may be combined with other software modules on a single server. Examples of directory service implementations are: Sun Microsystem's Network Information Service, Novell's eDirectory, Microsoft's Active Directory, Apple's Open Directory, and IBM's Tivoli Directory Server.

The configuration management database (CMDB) (108) is a repository of configuration items related to significant elements within the distributed computing system (100). The CMDB (108) records the configuration items and contains details about the important attributes and relationships between the configuration items. The CMDB (108) may be accessed by the service management applications hosted on the service management server (104) to gather information about the system's function and performance. The Operational Management Process (OMP) server (110) manages the organization's physical and application infrastructure, given the appropriate credentials. An example of an OMP server (110) is IBM's Tivoli Configuration Manager (TCM).

The service management server (104) also tracks the computer resources used by a variety of users (118). These computer resources may include individual work stations, servers, and various mobile or wireless devices. The service management server (104) may also connect to various external servers or resources upon which the organization relies to complete its functions. For example, the service management server (104) may connect to an external OMP server (120).

As discussed above, to connect to various resources, the service management server (104) must act as a requesting server and supply appropriate credentials to the remote system or server being connected. These credentials may be obtained by the service management server (104) directly from the IT administrator (102) by prompting the IT administrator (102) to enter the appropriate credentials to access a given resource. This method has the advantage of human involvement in, and control over, the connection process. The IT administrator (102) can directly authorize the connection and implement organization procedures by supplying the desired credentials or refuse to allow the connection. However, directly obtaining credentials from the IT administrator (102) to implement automated workflows is often impractical. In many circumstances, automated processes are performed during periods when other computing demands are lowest, such as during the night. Requiring an IT administrator (102) to supply credentials under such circumstances would impractically require that the IT administrator (102) be present and aware of the operation at any such hour. Additionally, repetitive requests to supply credentials can waste the time and effort of the IT administrator (102).

In an alternative method for supplying credentials required for the service management server (104) to complete its automated processes, the IT administrator (102) places the required credentials in data structures stored on the directory service (106). Then, when the service management server (104) needs to establish a connection to a remote server, the service management server (104) requests the credentials needed to connect to the remote server from the directory service (106). The directory service (106) then supplies the necessary credentials to the service management server (104). This 1:1 mapping between credentials and remote servers allows for automated processes to occur without the intervention of a human. However, it can result in a relatively inflexible method of supplying credentials that may be incompatible with organizational policies or security procedures. By way of example and not limitation, the organization may require that the first application connect to a remote server using a first set of credentials while a second application is required to connect to the same remote server using a different set of credentials. These organization-specific requirements vary from organization to organization and may be changed as the needs of the organizations evolve.

The IT administrator (102) may attempt to alter the functions of the various software and hardware modules to comply with such organization-specific requirements. However, as mentioned above, this requires that the IT administrator (102), organization, support entity, or creator of the system software make the code changes or additions to various interrelated components within the software. Making these changes can require a relatively high degree of training and knowledge about the implementation details of the system software. Additionally, this custom modification of the interrelated components can be cumbersome, expensive, and time consuming to update.

Figure 2:
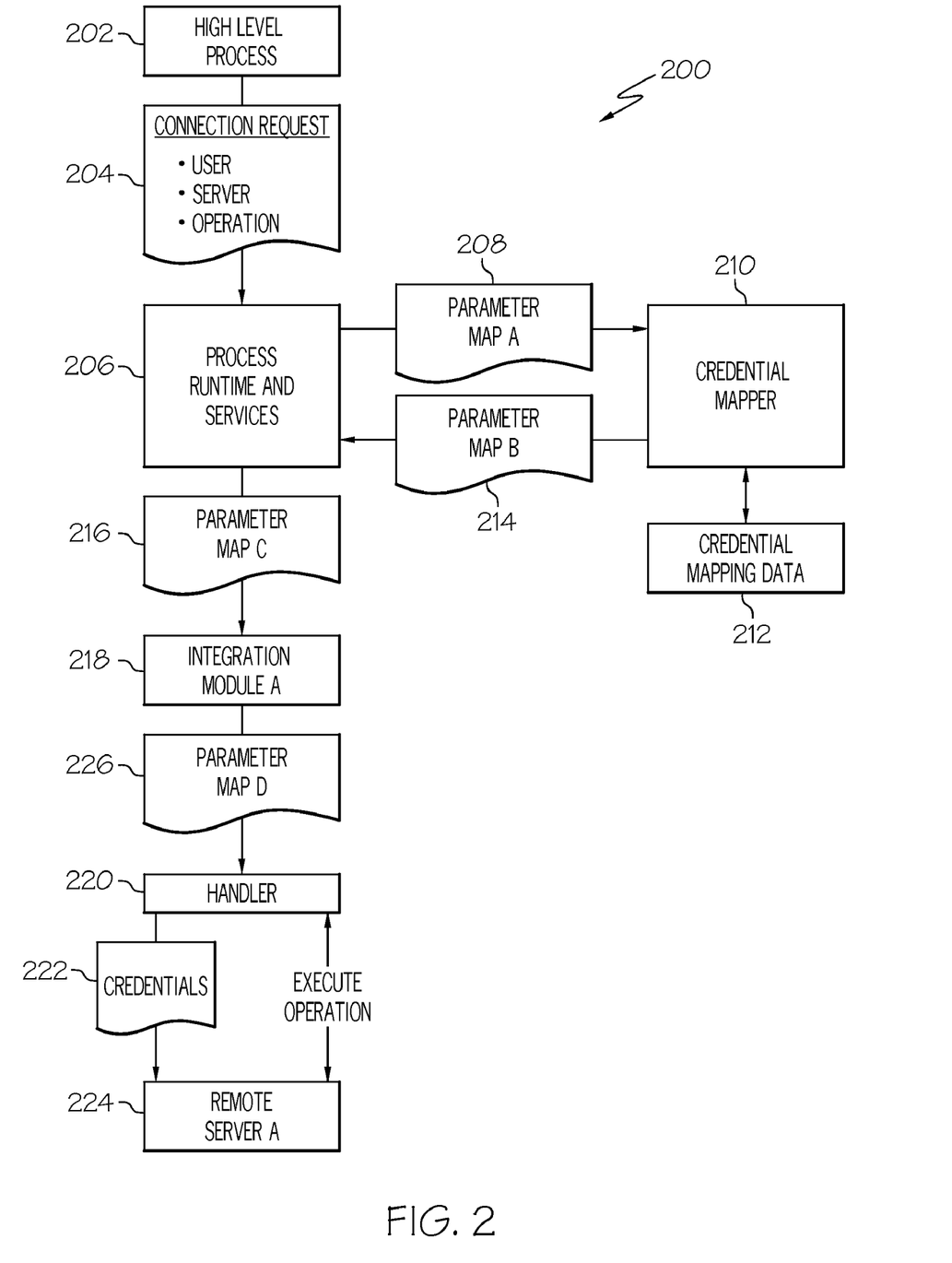
FIG. 2 is a diagram showing the interaction between various functional modules in a credential mapping workflow, according to one exemplary embodiment of principles described herein.

FIG. 2 is a diagram showing a credential mapping workflow (200) designed to supply necessary credentials according to organization-specific policies and provide additional flexibility during the establishment of a connection between systems or servers. According to one exemplary embodiment, a high level process (202) sends a connection request (204) to a process and runtime services module (206). The connection request (204) may originate from any application, workflow, or escalation that needs to access a remote system or server. The connection request (204) may contain a variety of information including the current user, the remote server that is the target of the connection request, and the operation that is to be performed over the connection. This is only one illustrative embodiment of such a connection request (204). Those of skill in the art will recognize that a variety of information could be contained within the connection request (204).

Upon receiving the connection request (204), the process and runtime services module (206) would normally extract information from the connection request (204) and obtain the necessary credential information by either directly querying an IT administrator (102, FIG. 1) or by accessing a directory service (106, FIG. 1). In this exemplary embodiment, however, the process and runtime services module (206) has a third method available to obtain the credentials required to connect to the remote server A (224). The process and runtime services module (206) creates and passes a parameter map A (208) to a credential mapper (210). The credential mapper (210) is a customer specific module that contains various security parameters, mappings, and other organization-specific code. According to one exemplary embodiment, the credential mapper (210) is an independent plug-in module that can be inserted, modified, or deleted without requiring any modification to other modules or default workflows. Specifically, the other methods for obtaining credentials remain operational and may be available apart from the existence or functionality of the credential mapper (210).

The parameter map A (208) may be a data container, a hashmap, or other suitable data structure. The parameter map A (208) may contain, for example, the name of a current user or identification of the requesting system and identification of the remote system or server to which a connection is to be made. The credential mapper (210) receives the parameter map A (208) and analyses it according to the customer specific security parameters. For example, if the organization requires that all administrators connect to the remote server (224) using a substitute username and password, the credential mapper (210) will access a database (212), retrieve the desired information, and apply the customer specific security parameters. According to one exemplary embodiment, the credential mapper (210) could evaluate a variety of business attributes to determine which alternative credentials are to be supplied to the process and runtime services (206). By way of example and not limitation, these business attributes could include the time of day, the level of network traffic, a security alert status, or any other relevant attribute. For example, in normal business hours the workflow invoking outbound connections could retrieve/calculate credentials that allow a broad scope of action. The same workflow during other times can connect with more restricted credentials. In this manner, the organization's desired security and other policies can be encoded into the pluggable credential mapping module (210) and be independent of the other components.

The information supplied by the credential mapper (210) is repackaged into parameter map B (214) and passed back to the process and runtime services module (206). The process and runtime services module (206) then outputs parameter map C (216) which is received by the integration module (218). Parameter map C (216) may contain information in addition to the information contained in parameter map B (214). For example, parameter map C (216) may contain information associated with the operation to be performed after the connection is established to the remote server A (224). The parameter map C (216) is in a format that is compatible with integration module A (218).

According to one exemplary embodiment, separate integration modules are required for each server requiring a different credential or data format. In FIG. 2, the integration module A (218) specifically formats the information to be compatible with remote server A (224). For example, an integration module may be paired with a remote web server which requires information in extensible markup language (XML) format. The integration module would then pack the information into XML format and pass the information in a parameter map D (226) to a handler (220). The handler (220) then opens a communication port and conveys the credentials to the remote server A (224) using the correct communication protocol. For example, if the handler (220) were connecting to a remote web server, the handler (220) would open a web service connection and transmit the XML data to the web server. If the credentials (222) are accepted by the remote server A (224), a connection is established and the operation is executed.

According to one exemplary embodiment, parameters maps B, C, and D (214, 216, 226) include the credentials supplied by the credential mapper. Parameter maps C and D (216, 226) include information identifying the remote server A (224) and the operation to be performed over the connection to remote server A (224).

Figure 3:
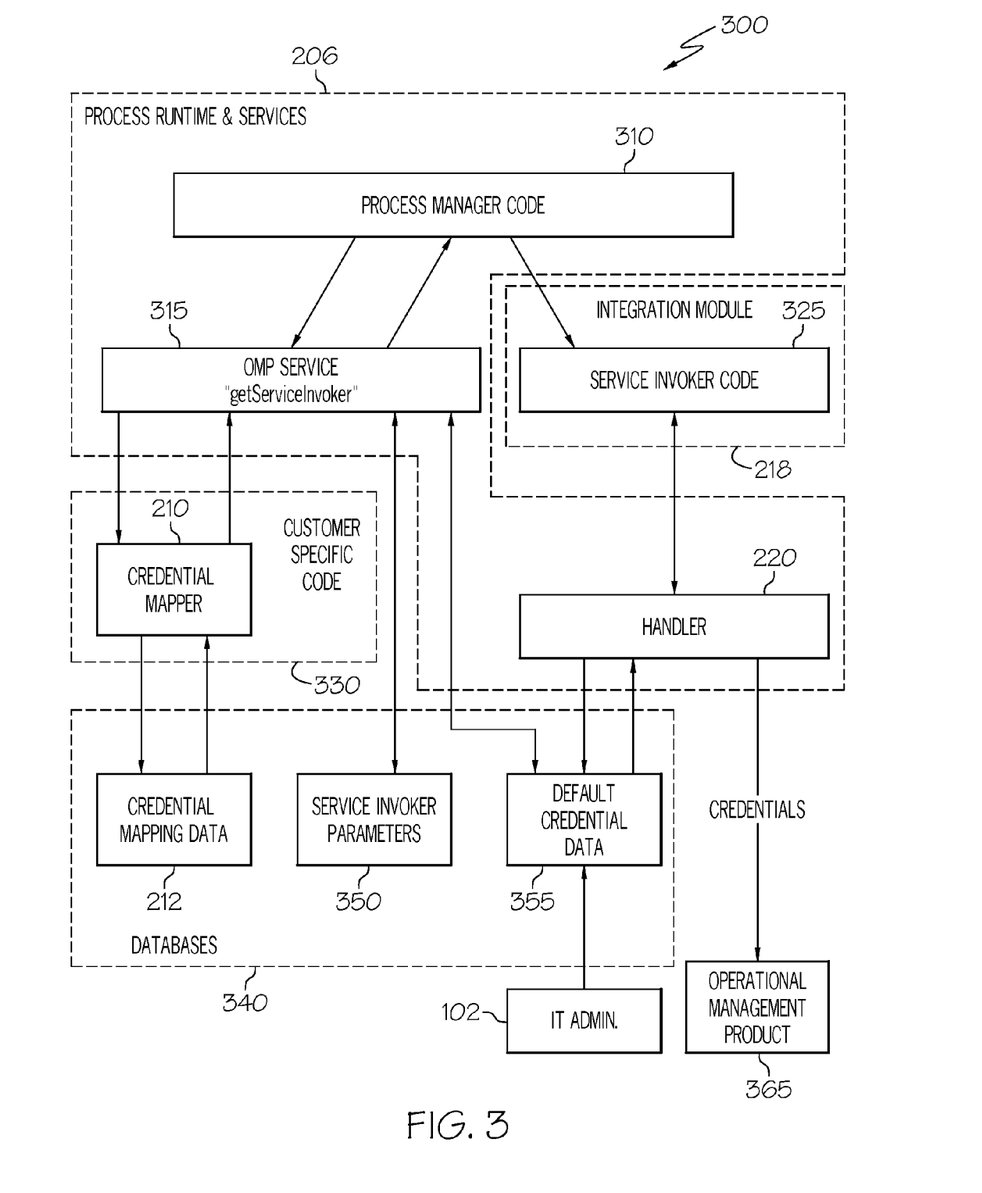
FIG. 3 is a diagram illustrating the implementation of a credential mapper workflow into a system management architecture, according to one exemplary embodiment of principles described herein.

FIG. 3 is a diagram illustrating the implementation of a credential mapper workflow (200, FIG. 2) within a service management architecture (300). Those of skill in the art will appreciate that the credential mapper workflow (200, FIG. 2) can be incorporated into a variety of architectures and systems that automate the establishment of connections between computer resources. According to one exemplary embodiment, the service management architecture (300) may have a variety of high level components such as a process runtime and services module (206), integration module (218), customer specific code (330) and databases (340). These high level components may perform a wide variety of operations and contain the various modules and code that interact during the connection process. These high level components may contain many additional components that are not directly involved in the connection process. For clarity, only segments or modules that are directly related to the connection workflow are illustrated in FIG. 3. By way of example and not limitation, the process runtime and services (206) may be comprised of the process manager code (310), an operational management process (315), and a handler (220). Databases (340) may represent a federated database or a number of individual databases that store credential maps (212), service invoker parameters (350), and default credential data (355).

According to one exemplary embodiment, the process manager code (310) receives a connection request from a higher level process. By way of example and not limitation, the higher level process may be an IT asset management process, an enterprise asset management process, a service catalog process, service/support process or other service management process. The process manager code (310) instantiates the OMP Service (315) and sends the OMP Service a "getServiceInvoker" command. The OMP service (315) is a component of the process runtime and services (206) that helps processes look up integration modules and their properties. The OMP Service (315) retrieves various service invoker parameters (350) from the databases (340). According to one exemplary embodiment, the service invoker parameters (350) are contained within the CMDB (108; FIG. 1). The OMP Service (315) then passes a parameter map A (208, FIG. 2) containing the relevant information to the credential mapper (210) contained within the customer specific code (330). The credential mapper (210) uses this information to calculate the proper credentials from the credential mapping data (212). According to one exemplary embodiment, the credential mapping data (212) is stored on the directory service (106; FIG. 1). The credential mapper (210) adds the credential information to the parameter map A (208, FIG. 2) to form parameter map B (214, FIG. 2). Parameter map B (214, FIG. 2) is passed back to the OMP Service (315).

The OMP Service (315) may also obtain default credential data (355) from the databases (340). Default credentials data (335) may be contained in data structures that represent the system or entity that is the ultimate recipient of an operation and may include information about the host, gateway, or system that is the destination of the operation. Default credential data (355) may provide information that is helpful to other modules in making a connection between two systems or servers by associating various system aliases with more concrete and unambiguous information about the remote system, such as an internet protocol (IP) address, uniform resource locator, or other network address. In this exemplary embodiment, the default credential data (355) supply the 1:1 mapping between the appropriate credentials and the remote system. According to one exemplary embodiment, the default credential data (355) are stored in the CM database ("CMDB") (108; FIG. 1). These default credential data (355) are accessible to the IT administrator (102). The IT administrator (102) may add, modify, or delete the default credential data (355).

The process manager code (310) analyzes and formats the information it receives to create parameter map C (216, FIG. 2) which is passed via the process manager code (310) to the service invoker code (325) within the integration module (218). As discussed above, the service invoker code (325) translates information contained in the parameter map C (216, FIG. 2) into the specific format required by the remote destination system. The service invoker code (325) then passes the formatted information to the handler (220). The handler (220) can access default credential data (355) to acquire additional information and passes the credentials over the appropriate communication protocol to the target remote system. In this illustrated example, the target remote system is an operational management product (365).

As described above there are now two sources for the system to obtain credential information during an automated workflow: the credential mapping data (212) and the default credential data (355). The following figures give further information about the process of incorporating the credential mapper (210) and credential mapping data (212) into the default connection workflow that utilizes credentials stored in default credential data (355). When both the alternative credentials supplied by the credential mapper and default credentials are present, a method of prioritizing which credentials to use in making the connection is also described.

Figure 4A:
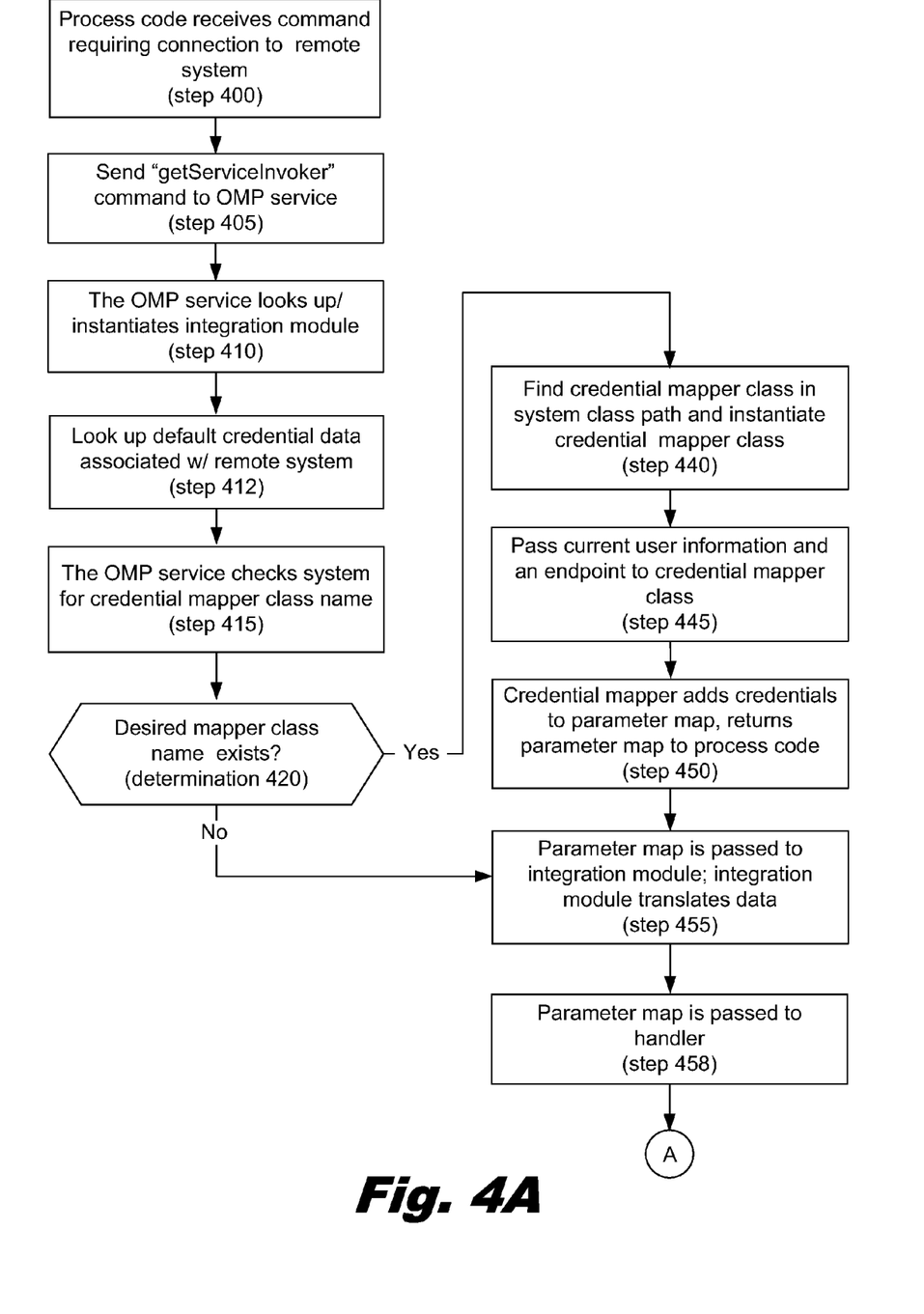
FIGS. 4A and 4B show a flowchart of one illustrative method of obtaining and utilizing credentials to connect to a remote server, according to one exemplary embodiment of principles described herein.
Figure 4B:
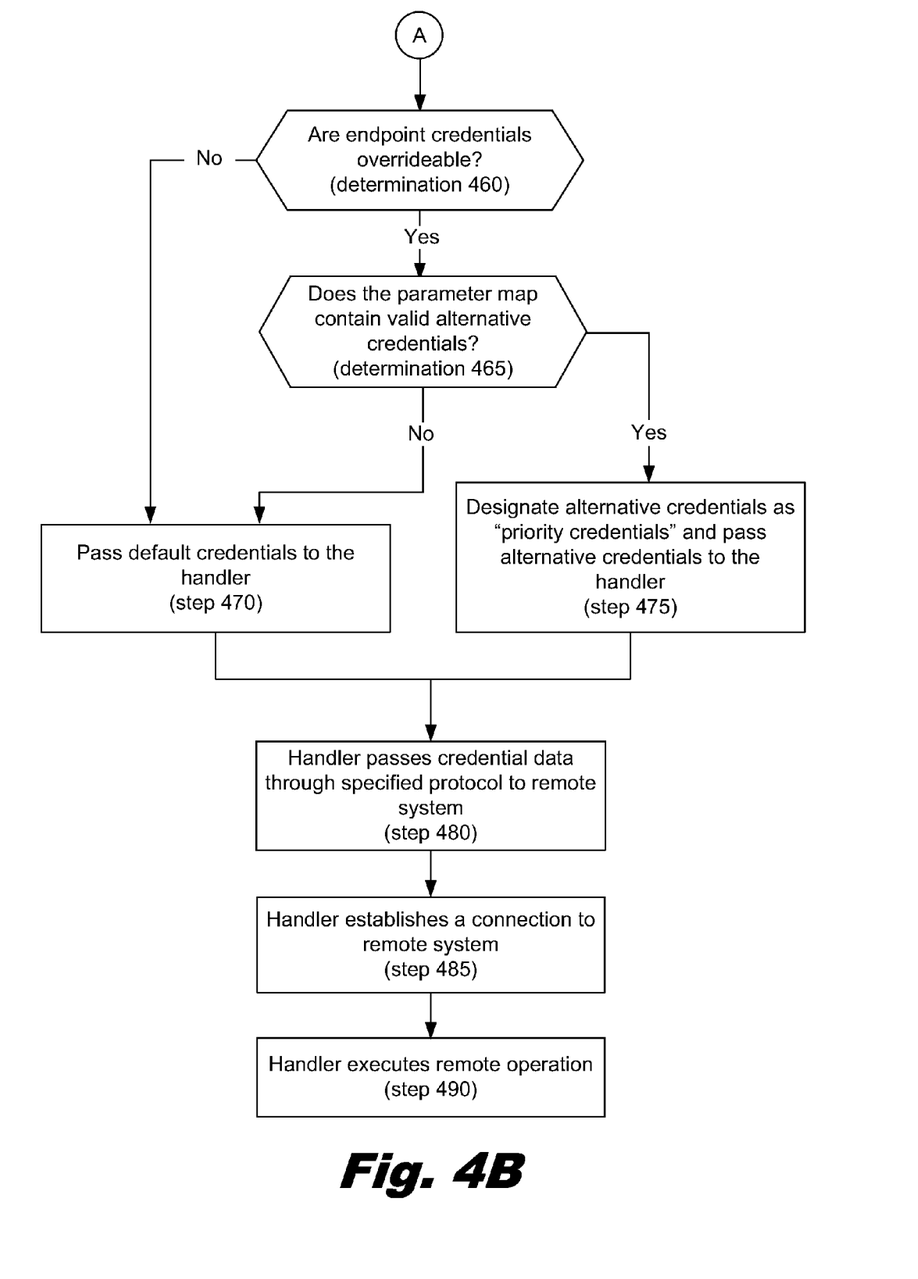

FIGS. 4A and 4B show a flowchart which illustrates one method of obtaining and utilizing credentials to autonomously connect to a remote system or server. As was previously described, the process code receives a command or request which requires a connection to a remote system or server (step 400). The process code sends a "getServiceInvoker" command to the OMP service (step 405). The OMP service looks up/instantiates the integration module (step 410) and looks up the default credential data associated with the remote system (step 412). The OMP Service then checks the system for a credential mapper class name (step 415). If the credential mapper class name exists, the credential mapper may contain alternative credentials/rules to utilize in the connection to the remote system. However, if the desired credential mapper class name does not exist (determination 420), the requesting system follows the default route to make a connection to the remote system, skipping steps involving the credential class mapper (steps 440, 445, 450) and going directly to step 455.

If the credential mapper class name does exist (determination 420), the credential mapper class in the system class path is found and the credential mapper class is instantiated (step 440). The current user information and default credential information from the process code is then passed into the credential mapper class (step 445) within a parameter map. The credential mapper class looks up the appropriate credentials from the credential map and adds the credentials to the parameter map, which is then returned to the process code (step 450). The parameter map is passed from the process code to the integration module (step 455). The parameter map is then passed to the handler (step 458).

Continuing in FIG. 4B, the integration module then determines if the default credentials are "overrideable" under an organization-specific policy (determination 460). The "overrideable" attribute is set by the administrator according to organization-specific policy when the default credential information is entered into the database. According to one exemplary embodiment, the default settings for default credentials are "overrideable" and the administrator can alter the "overrideable" attribute at any time. If the default credentials are "overrideable," the alternative credentials (if they exist) may be substituted for the default credentials under the organization-specific policy.

Steps 460 through 490 take place within the handler code or handler superclass code. Handler superclass code is code that is available to any handler without additional programming effort. According to one exemplary embodiment, the handler code and the handler superclass code comprise the handler module. These steps are used to evaluate the relative priority of the default credentials and the alternative credentials to establish whether the default credentials and the alternative credentials are the "priority" credentials that should be used to establish a connection with the remote system.

First, if the default credentials are not "overrideable," (determination 460) the handler superclass code passes the default credentials to the handler (step 470). The handler then uses the default credentials to make the connection to the remote system (steps 480, 485). If the default credentials are "overrideable" (determination 460) the handler superclass verifies that the parameter map contains alternative credentials supplied by the credential mapper (determination 465). If the alternative credentials are not present or invalid, the handler superclass passes the default credentials to the handler module (step 470), which then uses the default credentials to make a connection to the remote system (steps 480, 485). If the default credentials are "overrideable" (determination 460) and the parameter map contains valid alternative credentials (determination 465), the alternative credentials are determined to have priority over the default credentials, i.e., the alternative credentials are the priority credentials. Consequently, the default credentials are not used, but rather the alternative credentials are passed to the handler module (step 475). The handler module passes the alternative credentials through any specified protocol to the remote system (step 480). After the credentials are accepted by the remote system, the handler establishes the connection allowed by the alternative credentials (step 485) and executes the desired operation (step 490).

The method described above is only an example of a workflow that implements a modular credential mapper to allow organization-specific code and policies be to incorporated in an authentication and connection process. A wide variety of alternative workflows could also be used. By way of example and not limitation, the independent nature of the credential mapper allows it to be hosted on a variety of platforms and to be accessed at various places throughout the workflow.

In sum, organizations can efficiently implement their individual security protocols and process by utilizing a credential mapper module. The credential mapper module is an independent module that can be created, modified, and deleted without any intimate knowledge of the other components within the system. Further, the credential mapper operation is independent of the rest of the system. As described herein, the system is configured to look for and make use of the credential mapper, if available. However, the system will operate using default connection processes when the credential mapper does not exist, is unavailable or doesn't contain valid alternative credentials. When the credential mapper is in place and supplies valid alternative credentials, the system will use the valid alternative credentials to connect to the remote system if the default credential override parameters are asserted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for implementing organization-specific policy during establishment of an autonomous connection between computer resources in an environment that provides for a default connection workflow, said default connection workflow comprising default credentials for connecting a first computer resource to a second computer resource, and an alternative connection workflow, said alternative connection workflow comprising alternative credentials based on said organization-specific policy for connecting said first computer resource to said second computer resource, said method comprising:
   evaluating a relative priority of said default credentials and said alternative credentials to establish which of said default credentials and said alternative credentials are priority credentials; and
   establishing said connection between said first computer resource and said second computer resource based on said priority credentials.

2. The method of claim 1, wherein said evaluating said relative priority of said default credentials and said alternative credentials comprises determining if said default credentials are designated as overrideable.

3. The method of claim 2, further comprising designating said default credentials as said priority credentials if said default credentials are not designated as overrideable.

4. The method of claim 3, further comprising designating said alternative credentials as said priority credentials if said default credentials are designated as overrideable and said alternative credentials exist and are valid.

5. The method of claim 2, further comprising determining whether said alternative credentials exist and are valid if said default credentials are designated as overrideable.

6. The method of claim 1, wherein said alternative credentials grant a different level of access to said second computer resource than do said default credentials.

7. The method of claim 1, further comprising obtaining said alternative credentials from a credential mapper that is an independent module.

8. The method of claim 7, further comprising programming said credential mapper with said alternative credentials based on said organization-specific policy.

9. The method of claim 1, further comprising executing an operation over said connection.

10. The method of claim 1, wherein when the default credentials are the priority credentials, the method further comprises establishing said connection using said default connection workflow, said default connection workflow comprising:
- a process code receiving a connection request to make said connection between said first computer resource and said second computer resource, said process code instantiating an integration module and retrieving said default credentials and said alternative credentials, said process code combining said connection request, said default credentials, and said alternative credentials into a parameter map;
- an integration module receiving said parameter map and converting said parameter map into translated data, said translated data being compatible with said second computer resource;
- a handler module receiving said translated data and evaluating the relative priority between said default credentials and said alternative credentials, and using said priority credentials to make said connection with said second computer resource.

11. The method of claim 1, wherein said alternative connection workflow further comprises:
- passing at least a portion of said connection request to a credential mapper, said credential mapper using said at least a portion of said connection request to apply organization-specific code and return said alternative credentials to an integration module.

12. The method of claim 11, wherein said evaluating said relative priority of said default credentials and said alternative credentials comprises determining if said default credentials are overrideable and if said alternative credentials exist and are valid; wherein said alternative credentials are determined to be said priority credentials if said default credentials are overrideable and said alternative credentials exist and are valid.

13. The method of claim 12, wherein said default credentials are associated with an override parameter, said override parameter being selected to indicate if said default credentials are overrideable.

14. The method of claim 13, wherein said default credentials comprise data identifying said second computer resource, a protocol used to connect to said second computer resource, and a single username and password to be used to connect to said second computer resource.

15. The method of claim 12, wherein said credential mapper is configured to be programmed without requiring the programmer of the credential mapper to have a knowledge of implementation details of said integration module.

16. The method of claim 12, wherein said organization-specific code can be altered by modifying said credential mapper without modifying said integration module.

17. The method of claim 12, wherein said organization-specific code comprises security rules defining organizational entities authorized to connect to said second computing resource.

18. The method of claim 12, wherein said organization-specific code comprises a credential mapper, said credential mapper evaluating at least one business attribute during the calculation of said alternative credentials.

19. The method of claim 1, wherein said default credentials are accessible within a database such that an administrator can create, modify or delete said default credentials.

20. A computer program product for implementing organization-specific code during an autonomous establishment of a connection between computer resources, the computer program product comprising:
- a computer usable storage device having computer usable program code embodied therewith, the computer usable program code comprising:
- computer usable program code configured to establish a default connection workflow, said default connection workflow being configured to supply default credentials valid for connecting a first computer resource to a second computer resource;
- computer usable program code configured to establish an alternative connection workflow, said alternative connection workflow being configured to apply organization-specific rules to supply alternative credentials valid for connecting said first computer resource to said second computer resource;
- computer usable program code configured to evaluate a relative priority of said default credentials and said alternative credentials to establish which of said default credentials and said alternative credentials are priority credentials; and
- computer usable program code configured to use said priority credentials to establish said connection between said first computer resource and said second computer resource.

* * * * *